Oct. 20, 1959 Q. W. SIMKINS 2,909,677

TRANSISTOR CURRENT LIMITER

Filed May 29, 1956

INVENTOR
Q. W. SIMKINS
BY [signature]
ATTORNEY

United States Patent Office 2,909,677
Patented Oct. 20, 1959

2,909,677

TRANSISTOR CURRENT LIMITER

Quinton W. Simkins, Chatham Township, Morris County, N.J., assignor to Bell Telephone Laboratories, Incorporated, New York, N.Y., a corporation of New York Application May 29, 1956, Serial No. 588,013
6 Claims. (Cl. 307—88.5)

This invention relates to electrical circuits and, more particularly, to transistor circuits for delivering a contant current to a load.

Constant current sources are frequently required in pulse circuits such as computer systems and are particularly required in computer circuits using magnetic cores. Priorly, constant current sources have been devised using the nonlinear characteristics of a pair of serially connected diodes connected in series opposition between a pulse source and a load. A high voltage source is connected intermediate the two diodes by means of a high resistance. This type circuit delivers a current to the pulse source through one of the diodes and, in response to an incoming pulse, the current formerly delivered through this one diode is cut off and this current is now delivered to the load through the other diode. The series resistance between the high voltage source and the load limits the current. This limiting action, however, is achieved at the expense of wasted power and the requirement of a source of voltage many times higher than that required to be applied across the load.

An improved constant current device is disclosed in my application Serial No. 587,567, filed May 28, 1956, now Patent 2,882,482 issued April 14, 1959. The current delivered to the load in accordance with that application is limited by the bilinear impedance presented by the winding of a magnetic core, which core exhibits a rectangular hysteresis loop. The magnetic core winding presents this bilinear impedance because the duration of the current pulses through the winding is limited to a period insufficient to reverse the core magnetization.

It is an object of this invention to provide another improved current pulse limiter circuit.

It is another object of this invention to provide an improved current pulse limiter circuit for driving nonlinear loads.

It is a still further object of this invention to provide a simple current limiter having few components.

Briefly, in accordance with aspects of this invention, a transistor effectively presents a high linear impedance between a source and a load to control the magnitude of the current delivered to the load. This transistor has its emitter connected to a source and its collector connected to the load and a predetermined active region collector current is maintained. This collector current normally flows through a diode to a source of potential. In response to a gating pulse applied to a gate or switch in the load circuit, the predetermined collector current is diverted to the load. When the load impedance varies, current limiting takes place by virtue of the high linear collector impedance as depicted in the voltage-current characteristic. The predetermined value of collector current is determined by the amount of base current normally flowing. Advantageously, the base current may be adjusted by means of a variable resistor connected between the transistor base and a source of reference potential.

It is a feature of this invention serially to connect a transistor between a voltage source and a load and by means of the serially connected transistor to effectively present a high linear impedance to the source and thereby limit the load current.

It is another feature of this invention to connect a transistor emitter to a source and to connect the transistor collector to a load and to maintain a predetermined active region current flow through the collector, which current is diverted or switched to the load in response to the actuation of a switch in the load circuit.

It is another feature of this invention serially to connect a transistor between a source and a load by connecting the emitter to a source and the collector to the load and to connect a source of collector potential to the collector by means of a diode to maintain a predetermined active region current flow in the collector circuit, which current is switched to the load in response to gating pulses applied to a gate in the load circuit.

It is a still further feature of this invention serially to connect a high impedance-presenting transistor between a source and a group of parallel connected load circuits, maintaining the serially connected transistor in its active region with a predetermined collector current flow, which current is diverted to the transistor load circuits by individually actuating gates in the load circuits.

A complete understanding of this invention and of these and various other features thereof may be gained from consideration of the following detailed description and the accompanying drawing in which.

Figure 1:
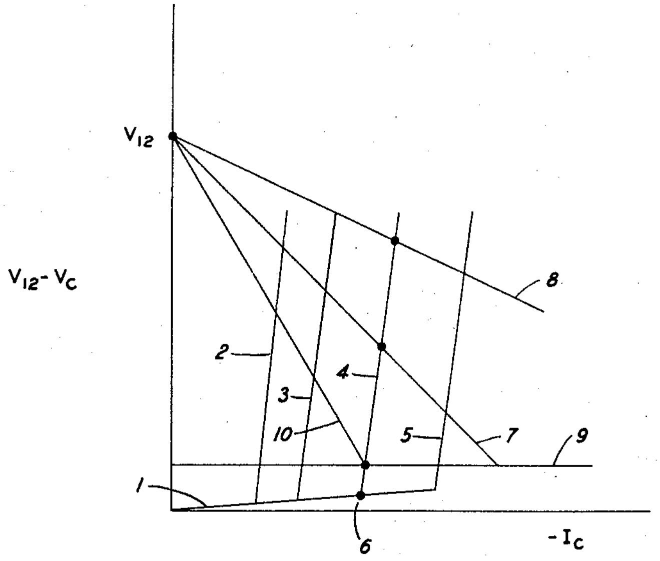
Fig. 1 is a plot of the operating characteristics of the circuit of Fig. 2.
Figure 2:
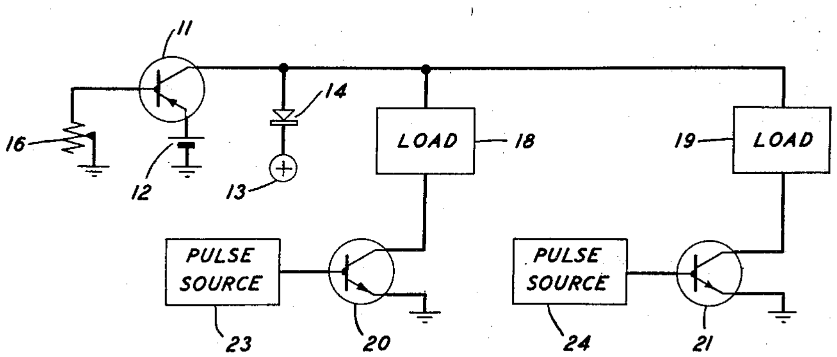
Fig. 2 is a schematic representation of one specific illustrative embodiment of this invention.

Referring now to Fig. 1, there is depicted a graphical representation of certain characteristics of the current limiting circuit depicted in Fig. 2. The abscissa of this plot is the negative transistor collector current while the ordinate is the emitter-to-collector voltage of the transistor 11. While this graph, for simplicity, is depicted in the first quadrant, both collector current and collector voltage are negative and ordinarily this graph is depicted in the third quadrant. Line 1 represents a first response characteristic of the collector current and, as indicated by its slight slope, depicts a low impedance to current flowing through the transistor. The region of operation depicted by line 1 is called the transistor saturation region. Lines 2, 3, 4 and 5 together with line 1 depict the base current family of transistor 11. For example, lines 1—2 might be the characteristics of a base current of one milliampere while lines 1—3 might be the characteristics for a base current of two milliamperes. Point 6 designates a transistion point in the collector current characteristic wherein the collector current goes from the saturation region to the active region, the latter region being designated in this instance by line 4. Lines 7 and 8 are load lines for different values of resistive load in the collector circuit of the transistor. Line 9 designates the characteristic imparted to the circuit by the diode connected to the collector. Subsequent reference will be made to this figure in explaining the operation of the schematic embodiment illustrated in Fig. 2.

Referring now to Fig. 2, there is depicted, in accordance with one specific illustrative embodiment of this invention, a current limiting circuit including transistor 11 which may be a point contact p-n-p transistor having characteristics as illustrated on page 1555 of the November 1952 Proceedings of the I.R.E. in an article entitled "Transistors in Switching Circuits" by A. E. Anderson. Improved results are obtained, however, by employing junction type power transistors such as discussed by R. N. Hall in an article in the November 1952 Proceedings of the I.R.E., entitled, "Power Rectifiers and Transistors." These improved results are effected by the steep slope of the active region collector current characteristic as well as the capability of the power transistor to deliver large load currents. A source 12 of positive voltage is connected to the emitter of transistor 11 while another source 13 of positive voltage is connected to the collector of transistor 11 through diode 14. Advantageously, source 12 is more positive than source 13. A variable resistor 16 is connected between the base of transistor 11 and a source of reference potential which, in this particular instance, is ground. Connected to the collector circuit is a pair of parallel connected loads 18 and 19. These loads may be nonlinear loads and advantageously may be windings of magnetic cores, which windings exhibit variable impedances. Serially connected between each of the respective loads and a source of reference potential are transistor switches 20 and 21. These transistor switches may be junction transistors and as herein depicted are of the n-p-n type. Transistor switches of this type are discussed in greater detail in P. A. Reiling application Serial No. 410,924, filed February 17, 1954. Transistors 20 and 21 may, however, be p-n-p transistors and, under this condition, transistor 11 would be of the n-p-n type, the diode and applied potentials from sources 12 and 13 being reversed in polarity from that shown in Fig. 2. Pulse sources 23 and 24 are connected to the respective bases of transistors 20 and 21 for the purpose of applying gating pulses to these transistor switches as will be subsequently explained.

The operation of the circuit as depicted in Fig. 2 is as follows. A portion of the current leaving the emitter from source 12 flows through the collector of transistor 11 and diode 14 to source 13. Source 13 is slightly less positive than source 12 and may be, for example, 15 volts as compared to 20 volts for source 12. Advantageously, diode 14 permits sources 12 and 13 to maintain transistor 11 in the active collector current region. A small fraction of the emitter current flows through the base to ground through resistor 16. By varying the resistance of resistor 16 a predetermined one of the base current family characteristics may be selected. For example, lines 1—4 of Fig. 1 may be selected which might represent a base current of 3 milliamperes. The current flowing from the collector of transistor 11 through diode 14 to source 13 may be diverted into either one of loads 18 or 19 by the selective application of a gating pulse to respective switching transistors 20 or 21. While only two loads are depicted, any number may be employed as long as only one at a time is selected. For example, if pulse source 23 applies a pulse to the base of transistor 20, transistor 20 is rendered conductive and since the load and the serially connected switching transistor 20 represent a low impedance path for the collector current, the current is diverted from diode 14 to load 18. In response to the termination of the pulse from source 23, transistor switch 20 again becomes nonconductive and the collector current again returns to diode 14. Subsequently, pulse source 24 can apply a pulse to the base of gating transistor 21 rendering transistor 21 conducting. Under these conditions the current previously flowing through diode 14 is diverted to load 19.

In accordance with aspects of this invention, current limiting is achieved by the high linear impedance presented by the collector of transistor 11 to current from source 12. Since the slope of line 4 is greatly exaggerated, it in reality being more nearly vertical, it is apparent that the collector current is limited to a value slightly in excess of the abscissa of point 6. For example, if the impedance of load 18 varied between the value indicated by the slope of line 7 and that value indicated by the slope of line 8, then the difference in load current under these varying conditions would be the difference in abscissae of the two intersections of these load lines with line 4. Since these differences in abscissae are so small, the load current can be considered to be substantially constant. This limiting action will take place as long as the load impedance does not exceed the value indicated by line 10 for a base current of 3 milliamperes. A load as indicated by line 10 would, however, be within the active collector current region and above the necessary minimum for a base current of 2 milliamperes as represented by line 3. If the load impedance were to exceed this value for a 3 milliampere base current, then the voltage would be limited by the diode as indicated by line 9 which would permit an unregulated current to flow to the load while maintaining the load voltage substantially constant. Such a condition is particularly undesirable in the instance of loads including magnetic core windings. For example, load 18 may actually be a number of windings of different magnetic cores serially connected. Assume for the purposes of explanation, that load 18 represents the windings of three magnetic cores connected in series and one of the cores is switching. In this case the entire voltage supplied to the load is across the winding on the core being switched and consequently the core switches very rapidly. If, on the other hand, all three cores are switching, the applied voltage is equally distributed among the three windings and, as a result, the speed of switching is decreased to one-third of the prior example. If, however, the driving source supplies a constant current, as opposed to a constant voltage, the speed of core switching is independent of the number of cores switching. This illustrates the advantages of driving magnetic core circuits with a constant current source and further illustrates the reasons for maintaining transistor 11 in its active region and maintaining the collector voltage such that diode 14 is not conducting while current is being supplied to the load.

Thus, it is apparent that this illustrative embodiment depicts a current limiting circuit requiring few components, which circuit delivers a regulated pulse having rapid rise time. Since the collector current flows at all times and transistor 11 is kept out of the saturation region by diode 14, the rise time is very short, it merely being determined by the transition time from the off to on condition of the switching transistors 20 and 21. Further, the load current may advantageously be determined by means of variable resistor 16 in the base circuit of transistor 11.

It is to be understood that the above-described arrangements are illustrative of the application of the principles of the invention. Numerous other arrangements may be devised by those skilled in the art without departing from the spirit and scope of the invention.

What is claimed is:

1. A transistor circuit for delivering a constant current including a continuously conductive transistor having emitter, collector and base electrodes, biasing means connected to said base, load means connected to said collector, a voltage source connected to said emitter, circuit means in shunt with said load means for normally maintaining the collector current in the active region, said active region presenting a high impedance to collector current, and means in circuit with said load for diverting said collector current from said circuit means to said load.

2. A transistor circuit in accordance with claim 1 wherein said load means includes a nonlinear impedance and wherein said means for diverting said collector current to said load includes switching means in circuit with said load and further includes means to actuate said switching means.

3. A transistor circuit in accordance with claim 1 wherein said means normally maintaining collector current in the active region includes diode means connected to said collector in shunt with said load and a source of potential connected to said diode remote from said collector.

4. A constant current pulse circuit including a transistor having emitter, collector and base electrodes, voltage means connected to said emitter, impedance means connected to a source of reference potential and said base, load means connected to said collector, means maintaining a predetermined active region substantial collector current flow, said active region presenting a high impedance to said collector current, said last-mentioned means including a source of potential connected to said collector and further including unilateral impedance means connected between said source of potential and said collector, and means for diverting said collector current to said load including switching means serially connected to said load means and means for actuating said switching means.

5. In a constant current circuit, a junction transistor having emitter, collector and base electrodes, voltage means connected to said emitter, impedance means connected to a source of reference potential and said base, nonlinear load means connected to said collector, said collector presenting a high linear impedance to said voltage means, a source of potential, normally conducting diode means connected between said source of potential and said collector, said source and said diode normally maintaining a predetermined active region current flow in said collector through said diode, means for diverting said predetermined collector current from said normally conducting diode to said load including switching means in circuit with said load, said switching means including a switching transistor having a conducting state and a normally nonconducting state, said switching means further including means for applying a pulse to said switching transistor to render said switching transistor conducting whereby the predetermined collector current of said junction transistor is diverted to said load thereby producing a constant current pulse in said load.

6. In combination, a transistor circuit and variable impedance load for delivering a determined constant current to said load comprising a normally conductive transistor presenting a high linear output impedance, said transistor having an emitter, a collector and a base, impedance means connected to said base for determining said current, voltage means connected to said emitter, and means connected to said collector for maintaining said determined current when no current is being delivered to said load.

References Cited in the file of this patent

UNITED STATES PATENTS

| | | |
|---|---|---|
| 2,657,318 | Rack | Oct. 27, 1953 |
| 2,665,845 | Trent | Jan. 12, 1954 |
| 2,722,649 | Immel et al. | Nov. 1, 1955 |